United States Patent
Stone

(10) Patent No.: US 6,947,204 B2
(45) Date of Patent: Sep. 20, 2005

(54) COMPACT WAVELENGTH SELECTIVE SWITCHING AND/OR ROUTING SYSTEM

(75) Inventor: Thomas W. Stone, Hellertown, PA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/719,112

(22) Filed: Nov. 21, 2003

(65) Prior Publication Data

US 2005/0111076 A1 May 26, 2005

(51) Int. Cl.⁷ .......................... G02B 26/08; G02B 27/10; G02B 5/18; G02B 6/26; G03B 21/00
(52) U.S. Cl. ................ 359/298; 359/618; 359/619; 359/621; 359/566; 353/31; 353/34; 385/16; 385/18; 398/45; 398/79; 398/84; 398/87
(58) Field of Search ................ 359/298, 290, 359/291, 618, 619, 621, 626, 566, 568, 569; 353/31, 34, 57; 385/16, 18, 109; 398/45, 79, 84, 87

(56) References Cited

U.S. PATENT DOCUMENTS

| | | | | |
|---|---|---|---|---|
| 5,231,432 A | * | 7/1993 | Glenn | 353/31 |
| 5,600,466 A | * | 2/1997 | Tsushima et al. | 398/79 |
| 5,692,077 A | * | 11/1997 | Stone et al. | 385/16 |
| 5,771,320 A | | 6/1998 | Stone | |
| 6,072,923 A | | 6/2000 | Stone | |
| 6,570,684 B1 | * | 5/2003 | Stone et al. | 398/45 |
| 6,647,209 B1 | * | 11/2003 | Boord et al. | 398/84 |

OTHER PUBLICATIONS

U.S. Appl. No. 10/700,828, filed Nov. 4, 2003. Applicant: Thomas W. Stone. Title: Wavelength Selective Switching and/or Routing System.

* cited by examiner

Primary Examiner—Loha Ben

(57) ABSTRACT

Compact systems with reduced insertion loss, and increased switch isolation and switching speed. The switching and/or routing devices utilize a separating sub-system, a switching and/or routing sub-system, and a recombining sub-system.

19 Claims, 14 Drawing Sheets

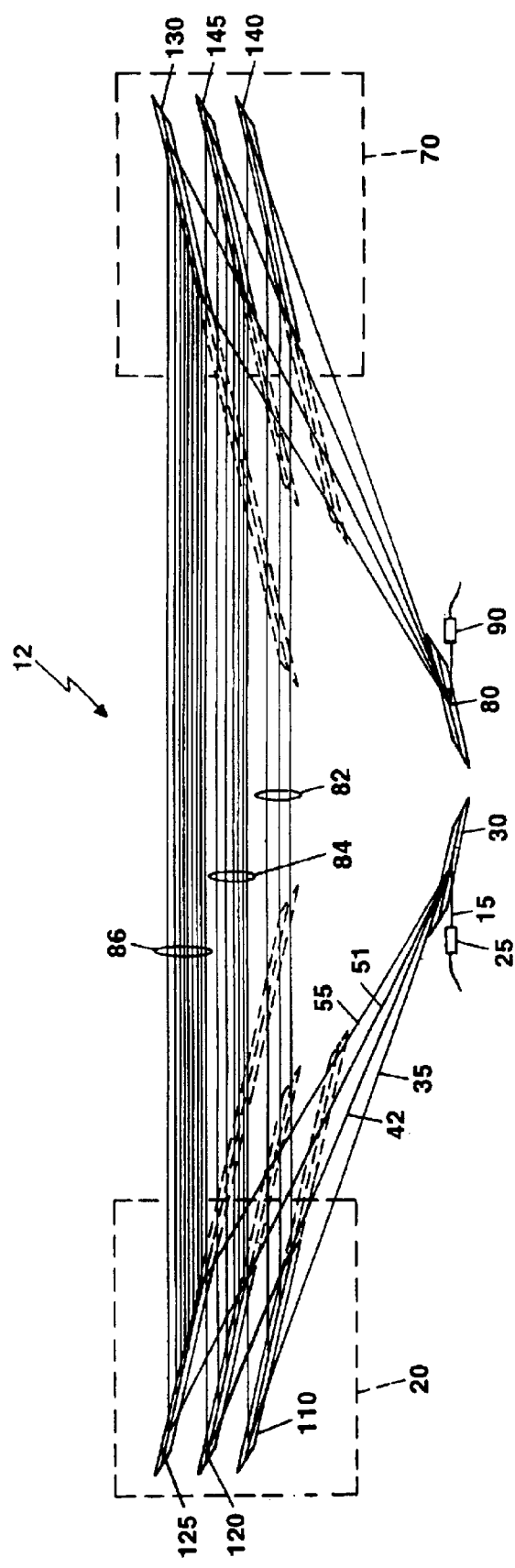

COMPACT WAVELENGTH SELECTIVE SWITCHING AND/OR ROUTING SYSTEM

FIELD OF THE INVENTION

The present invention relates generally to interconnection and switching systems, and, more particularly, to optical switching and interconnect systems which incorporate the use of selectable switching and routing components.

BACKGROUND OF THE INVENTION

With the advent of substantial new uses for high bandwidth digital and analog electro-optic systems, there exists a greater need to effectively control the routing and switching capability of electro-optic or optical signals from among many possible paths. This is especially true in digital computing systems where signals must be routed among processors; in analog systems such as phased array radar; and in the switching of high bandwidth optical carriers in communication systems. However, it should be realized that these are just several of numerous electro-optic systems which require the use of an optical switching or routing mechanism.

In many current and future systems light beams are modulated in a digital and/or analog fashion and used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels. Finally, operations that are difficult to perform in the lower (e.g., radio) frequencies such as time shifting for phased array applications can often be performed more efficiently and compactly using optical carriers.

A common problem encountered in many applications in which high data rate information is modulated on optical carrier beams is the switching and/or routing of the optical carriers from among an array of channels. These differing optical channels may represent, for example, routes to different processors, receiver locations, or antenna element modules. One approach to accomplish the switching is to extract the information from the optical carrier, use conventional electronic switches, and then re-modulate the optical carrier in the desired channel. However from noise, space, and cost perspectives it may be more desirable to directly switch the route of the optical carrier directly from the input channel to the desired channel.

Specific examples of switching and/or routing systems are systems that separate an array of input channels into even and odd channels or into bands of channels, Interleavers and Band Channelizers, and systems that attenuate (or filter) selected channels. Interleavers, Band Channelizers and Filters perform needed functions in optical communication systems, such as WDM and DWDM systems.

U.S. Pat. No. 5,771,320 discloses a free space optical switching and routing system utilizing a switchable grating based approach together with novel noise suppression techniques. This family of devices provides for an optical switching and routing system that is useful for interconnecting any of an input array's optical channels to any of an output array's optical channels. The invention disclosed in U.S. Pat. No. 5,771,320 has several distinct advantages including compactness, a reduction in insertion loss and the number of required switching devices and control signals.

U.S. Pat. No. 6,072,923 discloses an optical switching and routing system utilizing high efficiency switched mirrors. The switched mirrors can function, for example, by diffraction (diffractive mirrors) or reflection (reflective mirrors) and have the benefits of a lack of dispersion, where the steered direction does not strongly depend on wavelength.

The optical switching and routing system of U.S. Pat. Nos. 5,771,320 and 6,072,923 utilize a series of optical input signals, which form a vertical input array of m optical channels. These optical input signals may either be directly input to the switching and routing system, or they may originate as electrical input signals that are converted into optical signals prior to input in a conventional manner. Accordingly, this input array may include an array of optical fibers, semiconductor lasers (e.g., Vertical Cavity Surface Emitting Lasers or VCSELs), or free space beams.

There is a need for more compact systems, with lower insertion loss.

It is an object of this invention to provide an optical switching and/or routing system that provides for a compact geometry.

It is another object of this invention to provide an optical switching and/or routing system that provides for a low loss one-to-one optical interconnection from a set of input channels to a set of output channels.

SUMMARY OF THE INVENTION

The present invention overcomes shortcomings associated with insertion loss, size and compactness, switch isolation, switching speed, which may be present in current optical switching systems. The present invention includes switching and/or routing devices that use a separating sub-system, a switching and/or routing sub-system, and a recombining sub-system. In one embodiment of the present invention, the separating sub-system includes a first separating diffraction grating and separating means for enhancing space uniformity and the recombining sub-system includes recombining means for enhancing space uniformity and a first recombining grating. The separating means for enhancing space uniformity include, in one embodiment, two or more second separating diffraction gratings and the recombining means for enhancing space uniformity include two or more second recombining diffraction gratings.

In a second embodiment of the present invention, the switching and/or routing sub-system includes a selectable filtering sub-system. The selectable filtering sub-system includes one or more switchable gratings, switchable mirror arrays, or switchable liquid crystal arrays.

In a third embodiment of the present invention, the system includes a separating sub-system, one or more pixellated redirecting optical components, each of the pixellated redirecting optical components having a corresponding recombining diffraction grating, and a final redirecting component, also having a corresponding final recombining diffraction grating.

The selectable switching and routing sub-system can include a switchable grating based sub-system or a switchable mirror based sub-system such as those defined in U.S. Pat. Nos. 5,771,320 and 6,072,923 both of which are incorporated by reference herein.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 1c is a schematic representation of the propagation of channels in another embodiment of the system of this invention;

DETAILED DESCRIPTION OF THE PREFERRED EMBODIMENTS

Figure 1A:
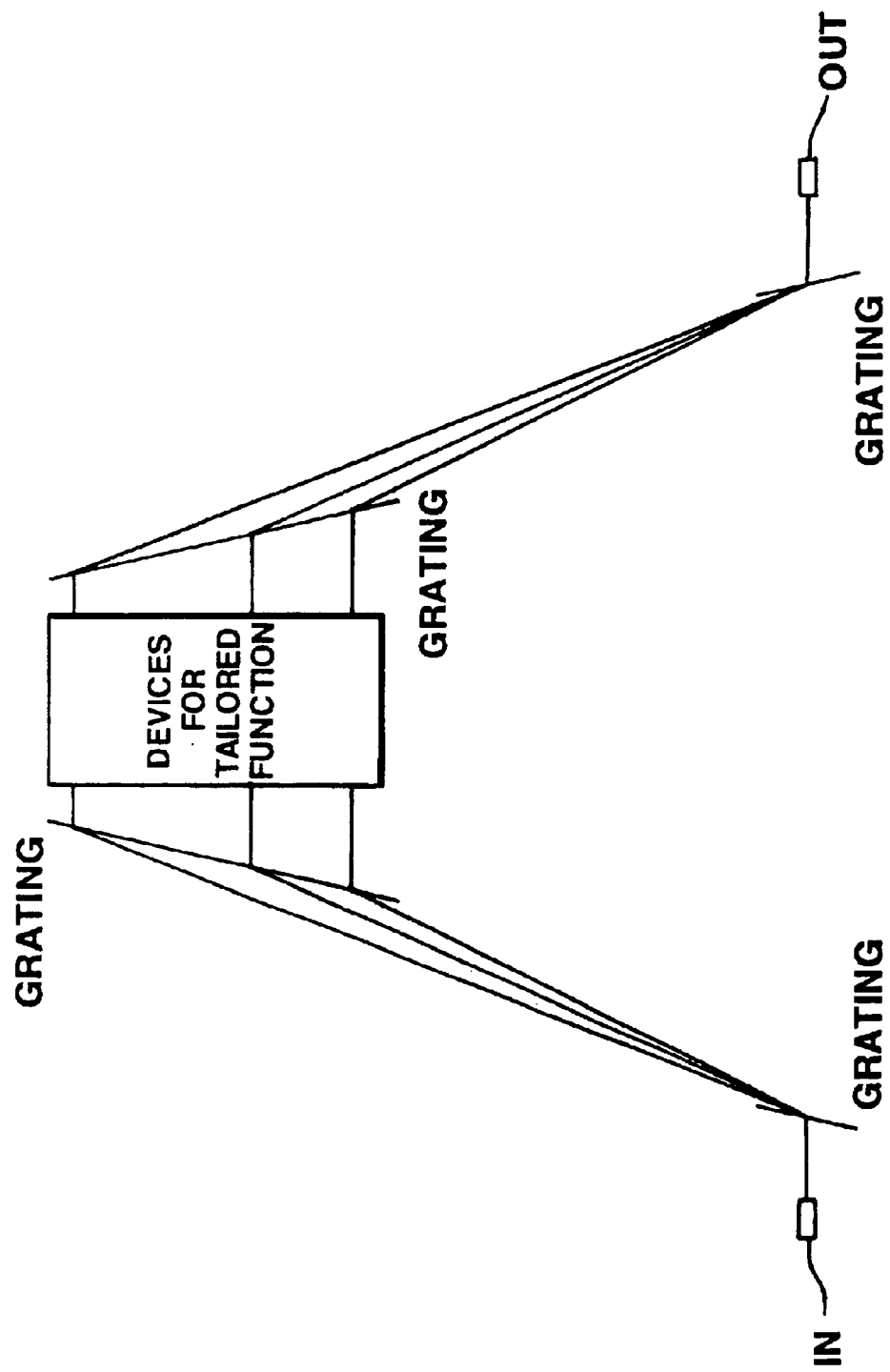
FIG. 1a is a schematic representation of one embodiment of the switching and/or routing system of U.S. patent application Ser. No. 10/700,828.

In order to better understand the present invention described below, it should be noted that certain terms used in the description of the invention have interchangeable usage. For example, the term "optical" refers not only to optical components, but also to electro-optical components.

Furthermore, terms such as "beams" and "ports" may also be interchanged, in certain instances, based upon their usage as recognized in the art.

In addition, identical components may be referred to with identical reference numerals within the specification and drawings for simplifying an understanding of the various components of this invention.

The present invention provides a compact optical switching and/or routing system utilizing diffraction gratings and mirrors and a selectable switching and routing sub-system. This invention also provides systems that separate an array of input channels into even and odd channels or into bands of channels, Interleavers and Band Channelizers, respectively, and systems that attenuate (or filter) selected channels. The present device or system, for example, is suitable for Wavelength Division Multiplexing (WDM) and Dense Wavelength Division Multiplexing (DWDM) applications. The incorporation within this invention of free space switching further provides several distinct advantages over past techniques. More specifically, these advantages include the potential for compact devices with lower insertion loss, superior switch isolation, multiple reflection and crosstalk suppression, and less complexity.

Reference is now made to FIG. 1a that illustrates a prior-art embodiment of a disperser-combiner that can be used for filtering, switching and routing, wavelength-selective cross connects, etc. In the dispersers and combiners, a grating pair (typically parallel to each other and with the same spatial frequency) is used to spatially separate the different wavelength components present in the input. One important limitation of this disperser-combiner is that the angular and spatial dispersion is nonlinear with wavelength, which makes the system large for several reasons, as described below.

Consider again the prior art disperser-combiner shown in FIG. 1a. Three spectral components of the input are illustrated propagating through the system of FIG. 1a. These three components represent the extreme (highest and lowest frequency) and middle spectral components of a standard WDM spectral carrier grid. The middle spectral component shown is that of the center channel, equally spaced (in frequency and in channels) from the extreme channels shown. However, due to the nonlinear angular dispersion of the grating and the geometry of the grating pair, the high frequency channels (short wavelength) are much more closely spaced than the lower frequency (longer wavelength) channels. This is clearly evidenced in FIG. 1 as there are the same number of WDM channels in the regions between the two extreme channels shown and the center channel, and yet the center channel is asymmetrically displaced well away from the spatial center of the band of channels.

Figure 1B:
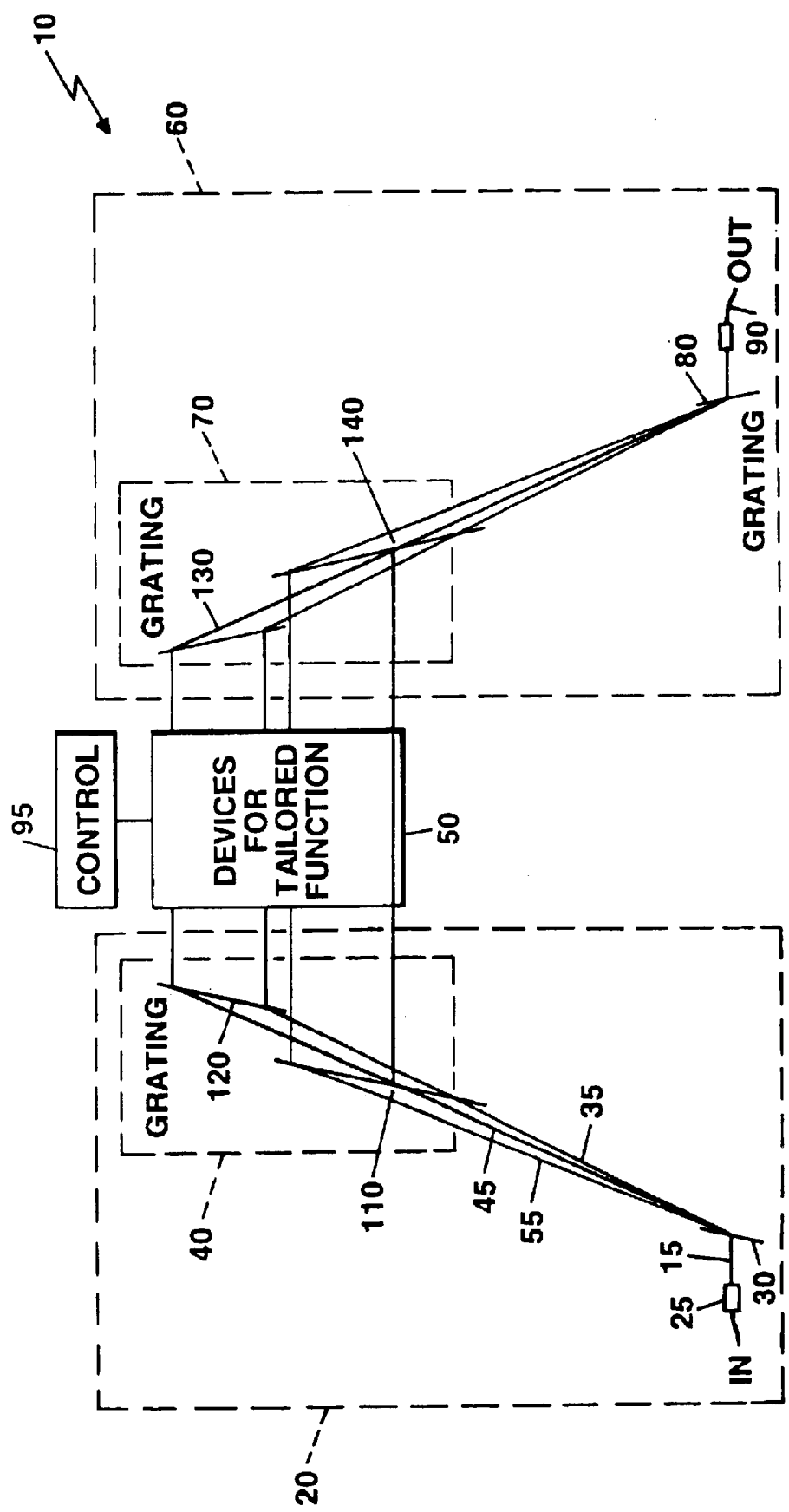
FIG. 1b is a schematic representation of an embodiment of the switching and/or routing system of this invention.

Reference is now made to FIG. 1b that illustrates an embodiment of a compact switching and/or routing system 10 of this invention. Separating grating 30 and separating means 40 for enhancing space uniformity constitute first optical sub-system 20. Gratings 110 and 120 constitute an embodiment of the separating means 40 for enhancing space uniformity. Recombining means 70 for enhancing space uniformity and recombining grating 80 constitute second optical sub-system 60. Grating 130 and grating 140 constitute an embodiment of a recombining means 70 for enhancing space uniformity. Optical sub-systems 20 and 60, selectable switching and routing sub-system, including filters, scatterers, absorbers, deflectors, or other devices for tailored function 50, and control means 95 comprise the switching and/or routing system 10.

During operation, input beam/port 25 provides input optical radiation 15 that impinges upon fixed grating 30. Grating 30 separates the input optical radiation 15 into distinct input channels 35 through 55. (The number of input optical channels is different for different embodiments. Only three are labeled in FIG. 1b.) In the embodiment shown in FIG. 1b, grating 110 is pixellated (segmented) into two regions, a diffracting and a non-diffracting region, and redirects the distinct input channels in the band between 45 through 55 (the lower frequency, longer wavelength band)

parallel to the input beam 15. Grating 110 further transmits channels in the band from 35 to 45 (the higher frequency, shorter wavelength band). This sharp spatial demarcation in the grating 110 can be accomplished for example by eliminating the modulation in the lower half of the grating during fabrication, cutting the grating (so the lower half is non-existent), or by patterning an electrode over at least one of the regions and electrically switching that region on or off to obtain the desired function. The boundary channel 45 may either be diffracted or transmitted by grating 110, or it may be deleted from the spectrum of channels entirely in order to relax tolerances in the fabrication of the multi-band dispersers and combiners 20 and 60 of the present invention. The transmitted (non-diffracted) channels from grating 110 then continue to propagate and further angularly disperse and separate until they are incident on Grating 120. Grating 120 then redirects the distinct input channels in the short wavelength band (channels from 35 to 45) parallel to the input beam 15. The separating means 40 for enhancing space uniformity (gratings 110 and 120 in FIG. 1b) separate the array of input channels 35 through 55 into two predetermined bands of said distinct input channels, 35 through 45 and beyond 45 through 55. The distinct input channels 35 through 55 are the inputs to the selectable switching and routing sub-system 50. The selectable switching and routing sub-system 50 includes one or more pixellated switchable components, where each pixellated, switchable component has a number of pixels, each of the pixels having a controllable state. Control means 95 controls the state of each of the pixels and enables the tailored function on the input channels 35 through 55 and producing output channels. The desired function may include, for example, switching and routing, filtering, attenuating, amplifying, modulating, scattering, deflecting, etc. of the input channels to produce the desired output channels as shown in FIG. 1b. (The number of output optical channels is different for different embodiments. Only three are shown in FIG. 1b.) Recombining means 70 for enhancing space uniformity and grating 80 redirect and recombine the output channels to output beam-port 90. (The number of output beam-ports is different for different embodiments. Only one is labeled in FIG. 1b.) The operation of recombining means 70 is the same and symmetric to that described above for the separating means 40.

The separating grating 30 is an embodiment of a separating optical component and the recombining grating 80 is an embodiment of recombining optical component.

Comparing FIG. 1b to FIG. 1a, the system 10 of FIG. 1b can result in a smaller system size than that of FIG. 1a and has, potentially greater channel spacing uniformity. The enhanced channel spacing uniformity may be obtained because in each of the systems, sufficient separation between grating 30 and separating means 40 must be provided to allow spatial separation of the various wavelength components. Since the higher frequency component channels (shorter wavelength channels) are deviated by smaller angles than the lower frequency spectral component channels (longer wavelength channels), and due to the geometry of the parallel gratings, and also since the shorter wavelength channels intercept the single second grating in FIG. 1 in a shorter distance than the longer wavelength channels, the configuration shown in FIG. 1 grows to be very large and spatially inefficient. When the shorter wavelength channels are spatially resolved, the longer wavelength channels are much more widely spaced than the shorter wavelength channels. The configuration shown in FIG. 1b can be much more compact, since the more rapidly dispersed longer wavelength channels are intercepted earlier before their separation grows larger than required, while the slower-dispersing shorter wavelength channels are given a longer distance over which to continue spatially separating to achieve the desired spatial separation. This also gives rise to, on average, a more uniform spatial spacing between the channels.

These benefits were obtained by splitting the upper gratings of the configuration of FIG. 1 into two gratings or "segments". Further benefits can be obtained by extending this segmented grating approach of the present invention to three or more segments. The more segments, the more uniform the channel spacing may become, and the more compact the system may be. Embodiments with two, three, four, and larger numbers of segments as described above are part of the present invention.

FIG. 1c depicts an embodiment in which three gratings, gratings 110, 120, and 125, constitute an embodiment of the separating means 40 for enhancing space uniformity. The selectable switching and routing sub-system 50 is not shown. The configuration of FIG. 1c not only includes three segments in the segmented grating as described above for FIG. 1b (instead of 2 segments), but the diffraction gratings are used at higher angles of incidence and diffraction than in the configuration of FIG. 1b, which increases dispersion and can further decrease system size. In FIG. 1c, the separating means 40 for enhancing space uniformity (gratings 110, 120, 125 in FIG. 1c) separate the array of input channels 35 through 55 into three predetermined bands of said distinct input channels, 35 through 42, beyond 42 through 51, and beyond 51 to 55. As described earlier the boundary channels 42 and 51 may either be diffracted or transmitted by gratings 110 or 120, respectively, or they may be deleted from the spectrum of channels entirely in order to relax tolerances in the fabrication of the multi-band segmented dispersers and combiners of the present invention. The three predetermined spectral bands of channels 82, 84, and 86 propagate through free space, as shown in FIG. 1c, to the recombining means 70 for enhancing space uniformity, gratings 130, 140, 145 in FIG. 1c. Recombining means 70 for enhancing space uniformity and grating 80 redirect and recombine output channels 35 through 55 to output beam-port 90. If, in FIG. 1c, grating 110, 120, 125, and 130, 140, and 145 are switchable gratings controlled by control means (not shown), system 12 could be an embodiment of a filtering system. The sharp demarcations of diffracting and non-diffracting (transmitting) regions of gratings 110, 120, 130, and 145 can be made using the techniques described for gratings 110 and 140 in FIG. 1b. Also, the gratings 110, 120, 125, 130, 145, and 140 can be extended as shown in the dashed outlines in FIG. 1c in order to facilitate construction of the system, which may be monolithically packaged using transparent spacers between the gratings. In such as case, the extended regions shown would be non-diffracting regions.

Figure 2:
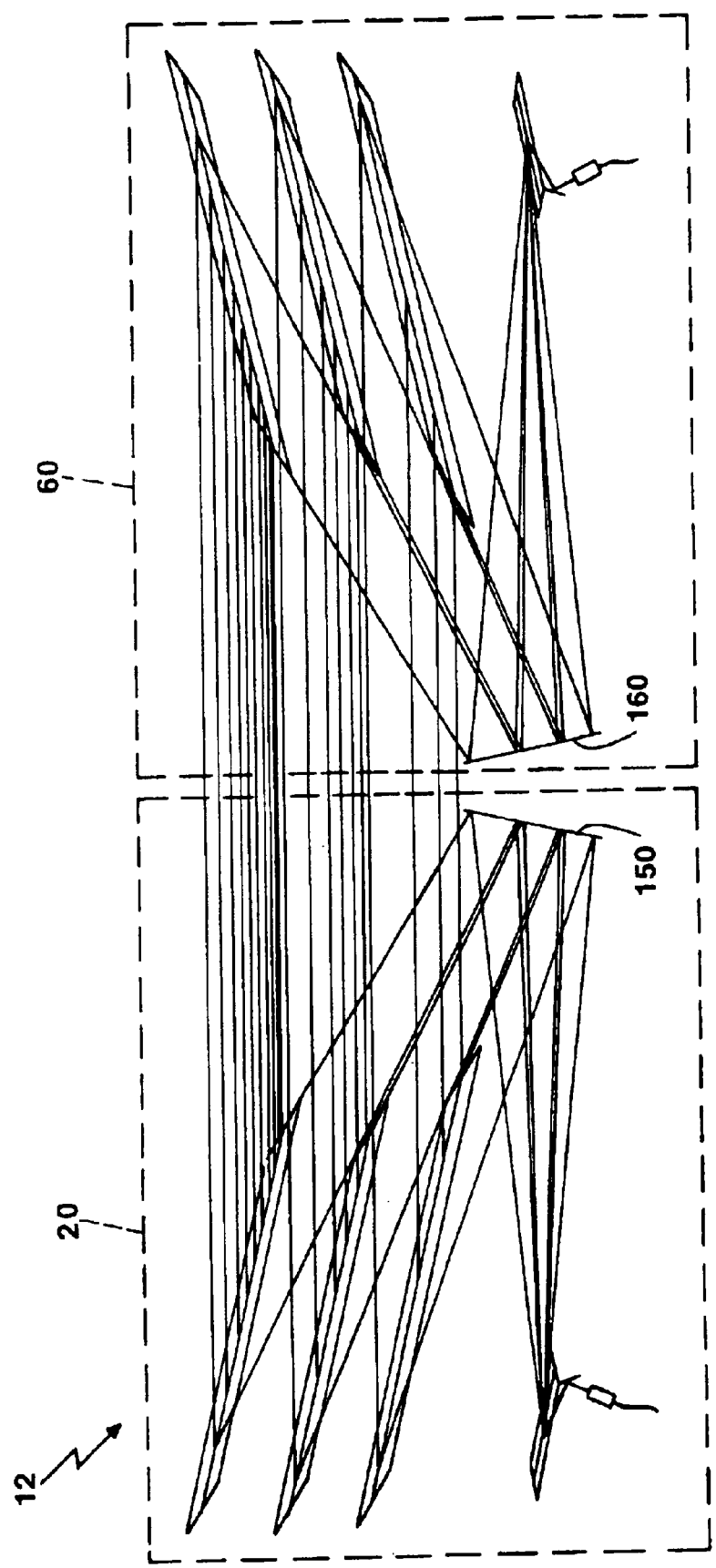
FIG. 2 is a schematic representation of the propagation of channels in another embodiment of the system of this invention.

As shown in FIG. 2, the size of system 12 can be further reduced by including a first folding mirror 150 in first optical sub-system 20 and a second folding mirror 160 in second optical sub-system 60.

Figure 3:
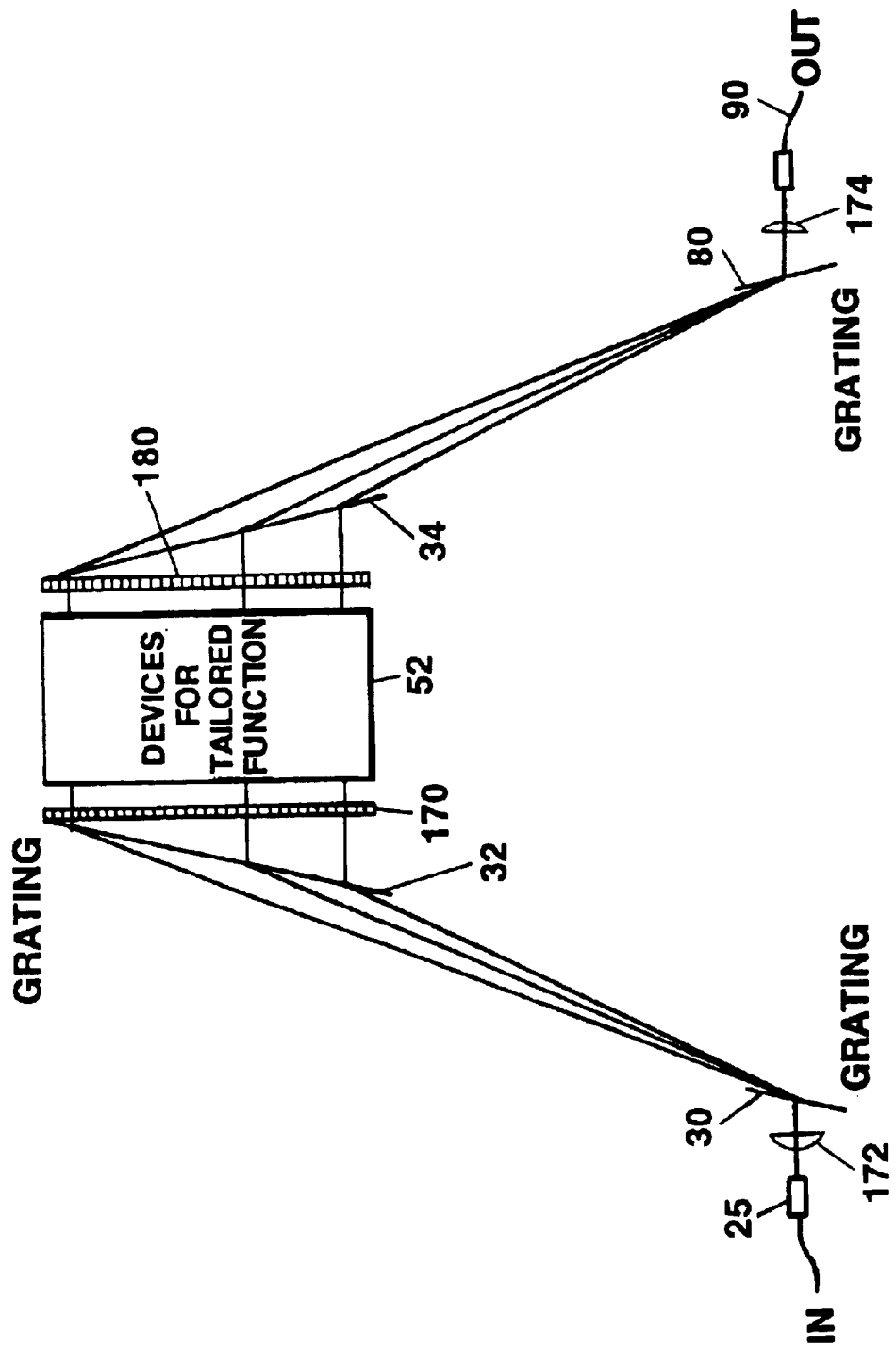
FIG. 3 is a schematic representation another embodiment of the switching and/or routing system of this invention incorporating lens arrays.

In a further embodiment, shown in FIG. 3, of system 12 of this invention, the system 12 includes a first lens array 170 interposed optically between grating 32 of the first optical sub-system and the selectable switching and routing sub-system 52, and a second lens array 180 interposed optically between the selectable switching and routing sub-system 52 and grating 34 of the second optical sub-system. These lens arrays can be used to further decrease the size of the optical system in several ways. First, since the beams travel in free space, there is a tradeoff between beam size (diameter) and the distance the beam can propagate before diffraction spreading will expand the beam into neighboring channels and produce crosstalk. Generally, as the beam diameter doubles, the propagation distance that is obtained before crosstalk effects dominate is quadrupled. Without the lens arrays 170 and 180 in the system, the input beam size must be large enough to propagate through the whole system. But larger beam diameters require increased distance between gratings 30 and 32 in order to separate the channel beams. With the inclusion of lens arrays 170 and/or 180, the input beam size only needs to be large enough to support low crosstalk propagation from the input to the lens array 170, from lens array 170 to lens array 180, and from lens array 180 to the output. Thus with one or more lens array such as 170 and 180 used to re-image the channels through the system, a smaller beam size is supported by the system than without the lens arrays. In addition, the beam size for each of the distinct spectral channels is an important parameter, since the scale of the overall system must be sufficient to spatially resolve these individual spectral component beams as described earlier. Thus, as the beam size for each of the component spectral channels is made smaller, the system size can decrease since only smaller-extent beams need to be resolved.

Another way in which the system size can be reduced is with the use of optional lenses 172 and 174. Lenses 172 and/or 174 can be used to further reduce the size of the individual spectral component beams in the regions of gratings 32 and 34. Lenses 172 and 174 may be either spherical or cylindrical, and by very weakly focusing the input beams to smaller beamwidths in the vicinity of gratings 32 and 34, the separations between gratings 30 and 32, and 34 and 80, can be further reduced because the degree of lateral dispersion required to separate the individual channels is reduced. As a result, overall system size is reduced.

Figure 4A:
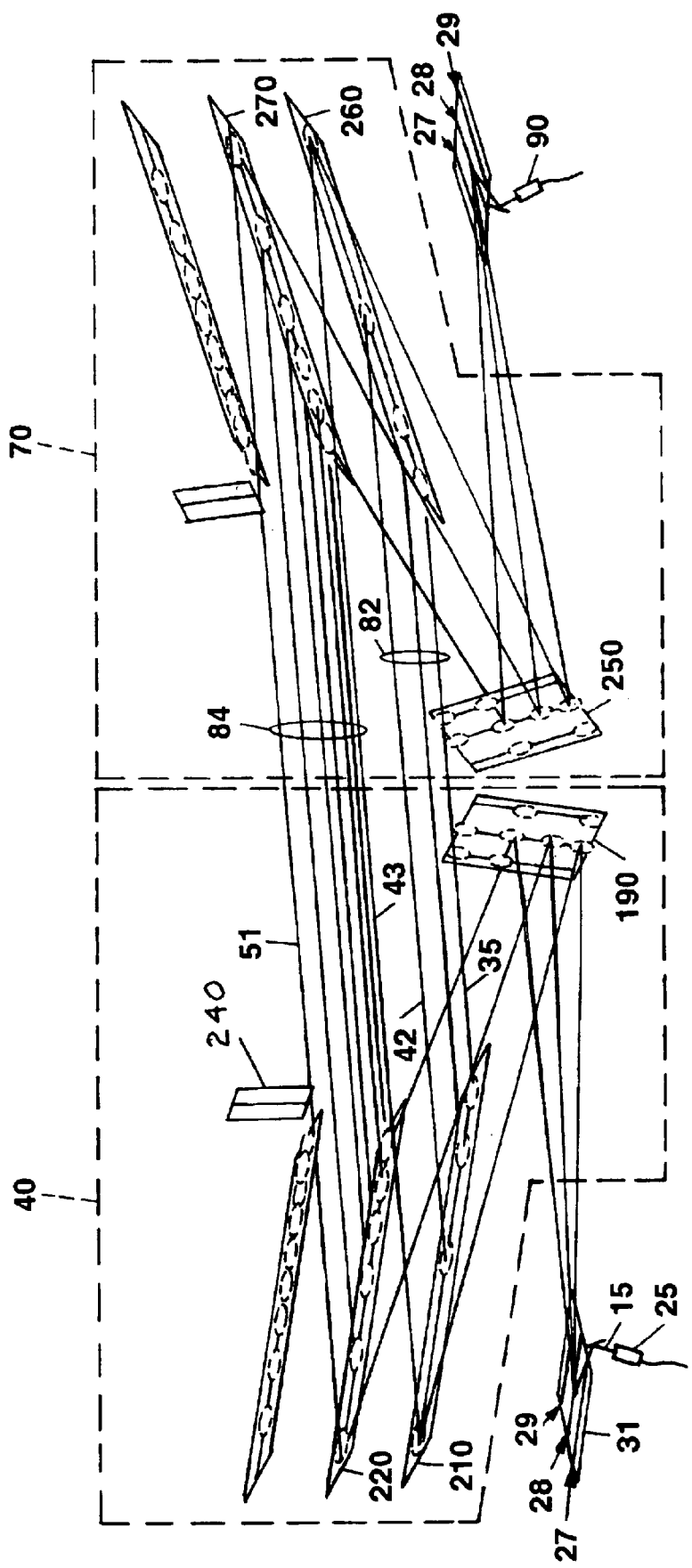
FIG. 4a is a schematic representation of the propagation of channels in yet another embodiment of the system of this invention, illustrating the propagation of a segment of the array of input channels.
Figure 4B:
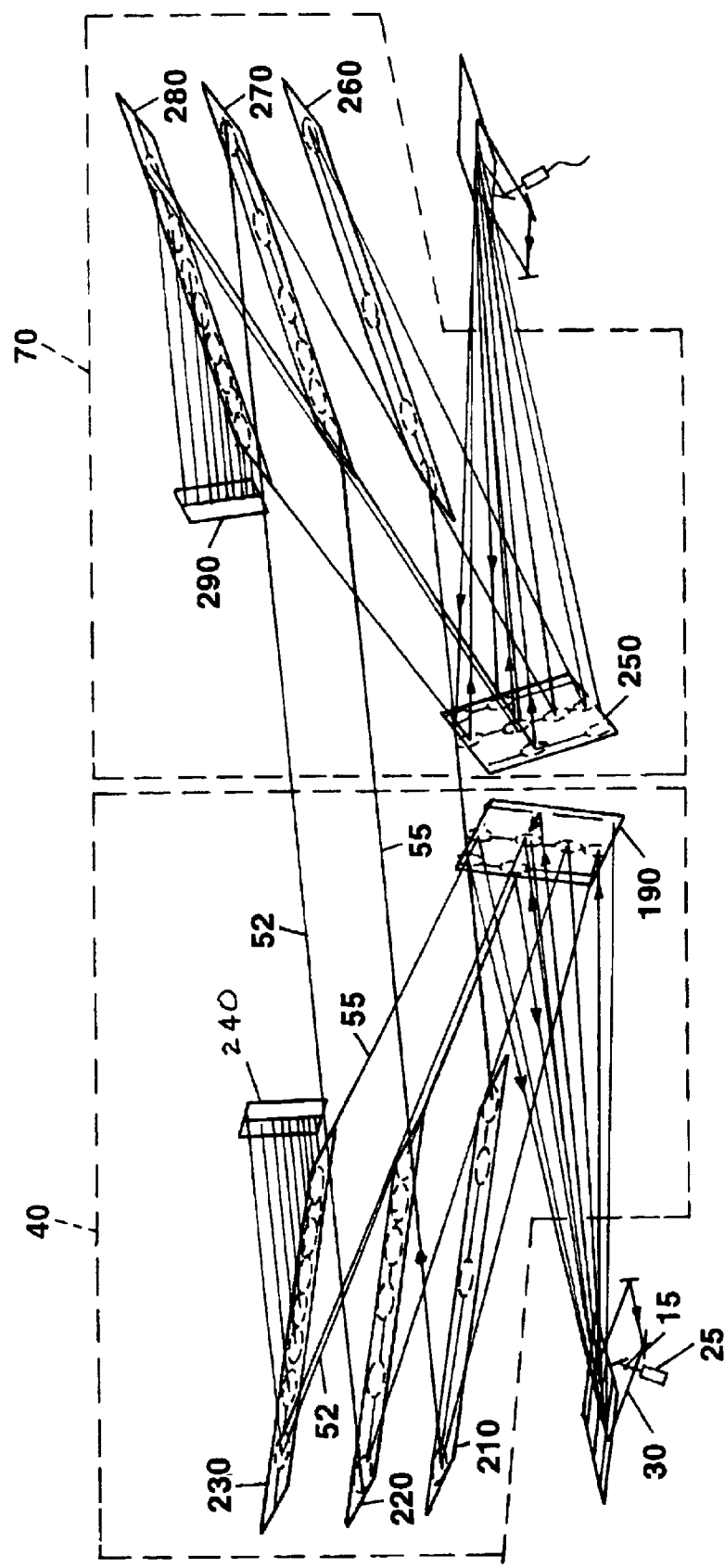
FIG. 4b is a schematic representation of the propagation of channels in the embodiment of the system of this invention shown in FIG. 4a, illustrating the propagation of another segment of the array of input channels.

In another embodiment of the separating means 40 for enhancing space uniformity and the recombining means 70 for enhancing space uniformity, shown in FIGS. 4a and 4b, the separating means 40 include a first folding mirror 190, two or more separating diffraction gratings 210, 220, 230, and a first retro-reflecting mirror 240. The recombining means 70 include a second folding mirror 250, two or more second recombining diffraction gratings 260, 270, 280, and, a second retro-reflecting mirror 290. This embodiment is a still more compact version of the embodiment shown in FIG. 2. The operation of the embodiment of FIGS. 4a and 4b is shown in two parts for clarity due to the complexity of the system. The physical system of FIGS. 4a and 4b is identical, however different spectral channels are illustrated in the two figures for clarity and to reduce the confusion in the drawing. Operation of the embodiment of FIGS. 4a and 4b is described below (and drawn to scale) for the case of 40 evenly spaced (in frequency) standard WDM spectral channels arranged in three spectral bands of channels (other embodiments contain other numbers of channels, and the current case of 40 total channels is described for illustrative purposes). The short wavelength spectral band of channels contains the 20 shortest wavelength channels (channels 52–55 in FIG. 4b). The next 12 longer wavelength spectral channels are contained in the mid-wavelength spectral band (channels spanning higher than 43 through to 51 in FIG. 4a); and the 8 longest wavelength spectral channels are contained in the long wavelength spectral band (channels 35 to 43).

FIG. 4a illustrates the propagation of the long wavelength channels and mid-wavelength channels. FIG. 4b illustrates the more complex treatment of the less-dispersed short-wavelength band of channels.

During operation, due to the nonlinearity of the dispersion in angle, the channels in the short wavelength spectral band of channels, are spatially much closer spaced than the channels in the mid-wavelength spectral band of channels, which are in turn closer spaced spatially than the channels in the long wavelength spectral band of channels. In order to reduce the size of the system, the long- and mid-wavelength spectral band of channels are transmitted through the system directly as in the configuration of FIG. 1c, but the short wavelength spectral band is treated much differently than in the configuration of FIG. 1c. FIG. 4a illustrates the treatment of the long and mid wavelength spectral band of channels. These channels enter the system as input beam 15, are dispersed by the center 28 of grating 31, and are reflected by the center of steering mirror 190. The 8 longest wavelength channels are re-diffracted by grating 210, while grating 220 diffracts the 12 mid-wavelength spectral channels. These 20 channels are then symmetrically recombined by the segmented gratings 260 and 270, reflected by the center of turning mirror 250, and diffracted to the output 90 by the center 28 of the final grating. The 20 channels in the short wavelength spectral band of channels, however, are treated very differently as described below.

While the larger angular dispersion at longer wavelengths spatially separates the mid- and long-wavelength spectral bands of channels, the system of FIGS. 4a and 4b is kept small, such that the channels in the shorter wavelength spectral band of channels are not spatially resolved past the interface with the mid-wavelength spectral band of channels. In the embodiment of FIGS. 4a and 4b, the channels in the shorter wavelength spectral band of channels (not individually spatially resolved) are retro-reflected back through the system by the retro-reflecting mirror 240 as an unresolved band, and with a small horizontal offset, are reflected off the side of the steering mirror 190 and are then spatially recombined in a multiplexed spot in the side 29 of the initial grating 30 as shown in FIGS. 4a and 4b. Grating 30 then outputs the combined channels of the short wavelength spectral band which is then reflected by mirrors and input again into grating 30 parallel to the original input direction of beam 15 into grating 30, but this time into a side region 27 of grating 30. Region 27 of grating 30 has a higher spatial frequency than the rest of grating 30, such that the 20 channels of the short wavelength spectral band of channels are now diffracted through the same range of angles that the 20 channels in the mid- and long-wavelength spectral band of channels were diffracted through previously. Thus the 20 channels in the formerly unresolved short wavelength spectral band of channels are now spatially resolved and are diffracted by neighboring high-frequency areas of gratings 210 and 220 just as the 20 channels of the mid- and long-wavelengths spectral bands of channels were diffracted. Propagation of these 20 channels in the short-wavelength spectral band of channels is symmetric through the compact combining subsystem 70 as has been explained for the separating sub-system 40. Accordingly, the 20 short-wavelength channels are diffracted by high frequency neighboring regions of gratings 260 and 270, reflected off steering mirror 250, combined by the high frequency grating stripe 27, steered to be again incident on the low frequency area 29 of the grating, where it is diffracted, reflected by steering grating 260, diffracted as unresolved channels by grating 280, reflected by retro-reflecting mirror 290, again diffracted by grating 280, reflected off mirror 250, and combined with the final output beam into output port 90.

Combinations of the multiple grating segments as in FIGS. 1b and 1c, spectral layers as in FIGS. 4a and 4b, unequal (imaged) spot or beam sizes as in FIG. 3, and mirror folds as in FIG. 2, yield a size reduction of orders of magnitude over the equivalent simple system of FIG. 1a.

Detailed embodiments of the optical switching and routing system of this invention and of the invention of U.S. patent application Ser. No. 10/700,828 are described herein below.

Figure 5A:
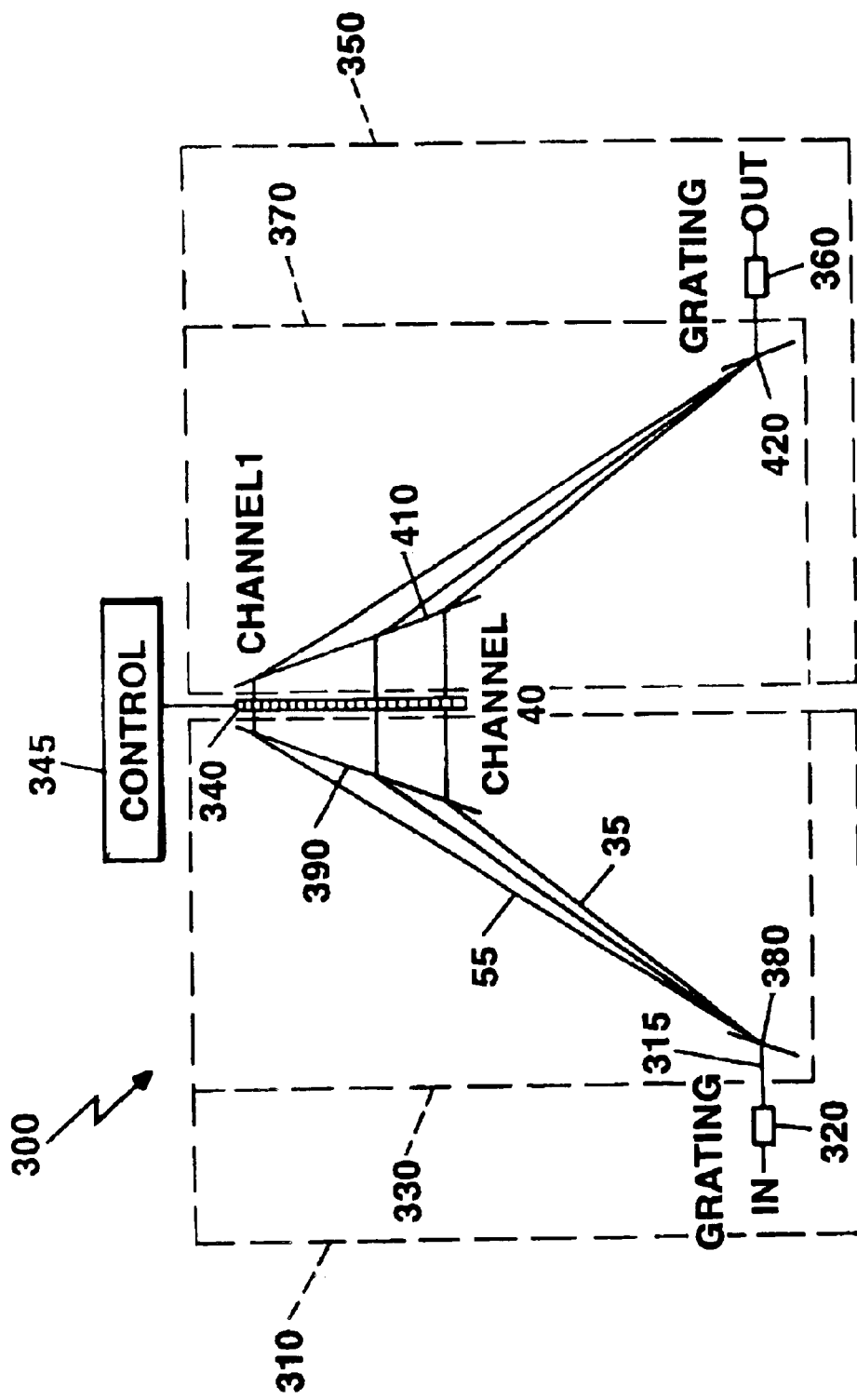
FIG. 5a is a schematic representation of a filtering system of this invention utilizing one embodiment of the separating and recombining sub-systems of this invention.

Referring to FIG. 5a, a filtering system 300 of this invention includes a optical separating sub-system 330, a optical recombining sub-system 370, and a selectable filtering sub-system 340, interposed optically between the separating optical sub-system 330 and the optical recombining sub-system 370. The selectable filtering sub-system 340 includes one or more pixellated switchable components. Each pixellated, switchable component has a number of pixels and each of the pixels has a controllable state. Control means 345 control the state of each of the pixels.

During operation, input beam/port 320 provides input optical radiation 315 to separating sub-system 330. Separating sub-system 330 separates the input optical radiation 315 into distinct input channels 35 through 55. (The number of input optical channels is different for different embodiments. Only three are labeled in FIG. 1b.) The distinct input channels 35 through 55 are the inputs to the selectable filtering sub-system 340. The selectable filtering sub-system 340 filters (for example through attenuations, scatter, or deflection out of the system) selected channels from the distinct input channels 35 through 55. When a pixel is "off" or transparent in one of the pixellated, switchable components, the corresponding channel is transmitted to the output with little loss. When a pixel is "on", the corresponding channel is substantially removed out of the system. Recombining sub-system 370 redirects and recombines output channels 35 through 55 to output beam-ports 360.

In one embodiment, the pixellated, switchable components are electrically switchable diffractive gratings, such as those disclosed in U.S. Pat. No. 5,771,320. It should also be noted that, although in that embodiment the gratings are electrically switched, other embodiments are possible. Other possible means for controlling the state of the pixels (switching the gratings) are electrical switching, optical switching, and polarization switching of the gratings. Embodiments utilizing optical switching and polarization switching of the gratings are disclosed in U.S. Pat. No. 5,692,077, which is hereby incorporated by reference.

In another embodiment, the pixellated, switchable components are arrays of switchable mirrors, such as those described in U.S. Pat. No. 6,072,923, which is hereby also incorporated by reference. The switchable mirrors used in U.S. Pat. No. 6,072,923 can be made using many technologies, such as volume holographic mirrors, multilayer mirrors, deformable mirrors and micro electromechanical mirrors. But the common feature is that the mirrors exhibit a reflectance that is variable and controllable. When in an "off" state, the mirrors are transparent (or, alternatively, displaced out of the path of the incident beam). When in an "on" state, the mirrors are reflective (or, alternatively, displaced into the path of the incident beam).

In yet another embodiment, the pixellated, switchable components are elements of a switchable liquid crystal array. It should be noted that switchable liquid crystal elements are known in the art.

In the embodiment of system 300, shown in FIG. 5a, the separating sub-system includes a first separating diffraction grating 380, and a second separating diffraction grating 390 and the recombining sub-system includes a first recombining diffraction grating 410, and a second recombining diffraction grating 420. The techniques of the present invention described earlier for shrinking the size of the system through the use of segmented gratings as in the configurations of FIGS. 1b and 1c, steering mirrors as in the configuration of FIG. 2, diffraction from multiple-frequency gratings as in the configuration of FIGS. 4a and 4b, and multiple imaging to reduce beam size as in the configuration of FIG. 3, can be used to further shrink the size (and increase the uniformity of the spacing of the channels) of system 300 shown in FIG. 5a.

Figure 5B:
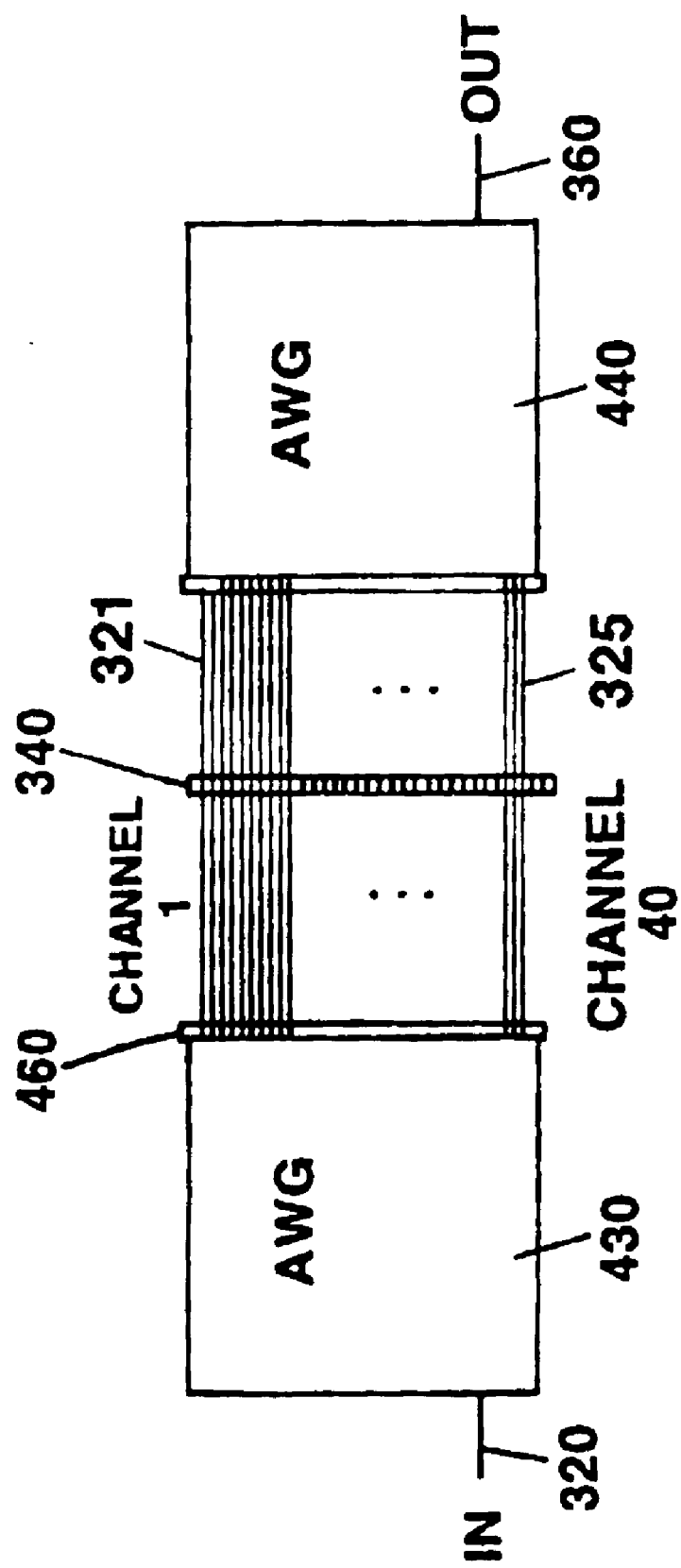
FIG. 5b is a schematic representation of a filtering system of this invention utilizing another embodiment of the separating and recombining sub-systems of this invention.

Another embodiment of system 300, in which the separating and recombining sub-systems utilize a first array waveguide grating (AWG) 430 as the separating sub-system and a second array waveguide grating (AWG) 440 as the recombining sub-system, is shown in FIG. 5b. In the configuration of FIG. 5b, microlens array 460 is used to transform the output of the AWGs into free space micro-optic beams and another microlens array (shown symmetrically located in FIG. 5b) can be used to couple the free space micro-optic beams back into the AWG device. The microlens arrays such as 460 may contain anamorphic microlenses to improve coupling efficiency between free-space and waveguide, and also to circularize the free-space beam, if desired. In addition, the planes containing microlens arrays can also include Polarization Diversity Filters (PDFs) on the free-space side of the microlens arrays) to render the two polarization components of the channels into twin beams with identical polarization (and later recombine the twin beams into single beams of combined polarization). This may be desirable where very uniform insertion loss is desired independent of polarization, or when polarization sensitive devices (such as some types of switchable diffraction gratings) are used.

Figure 6:
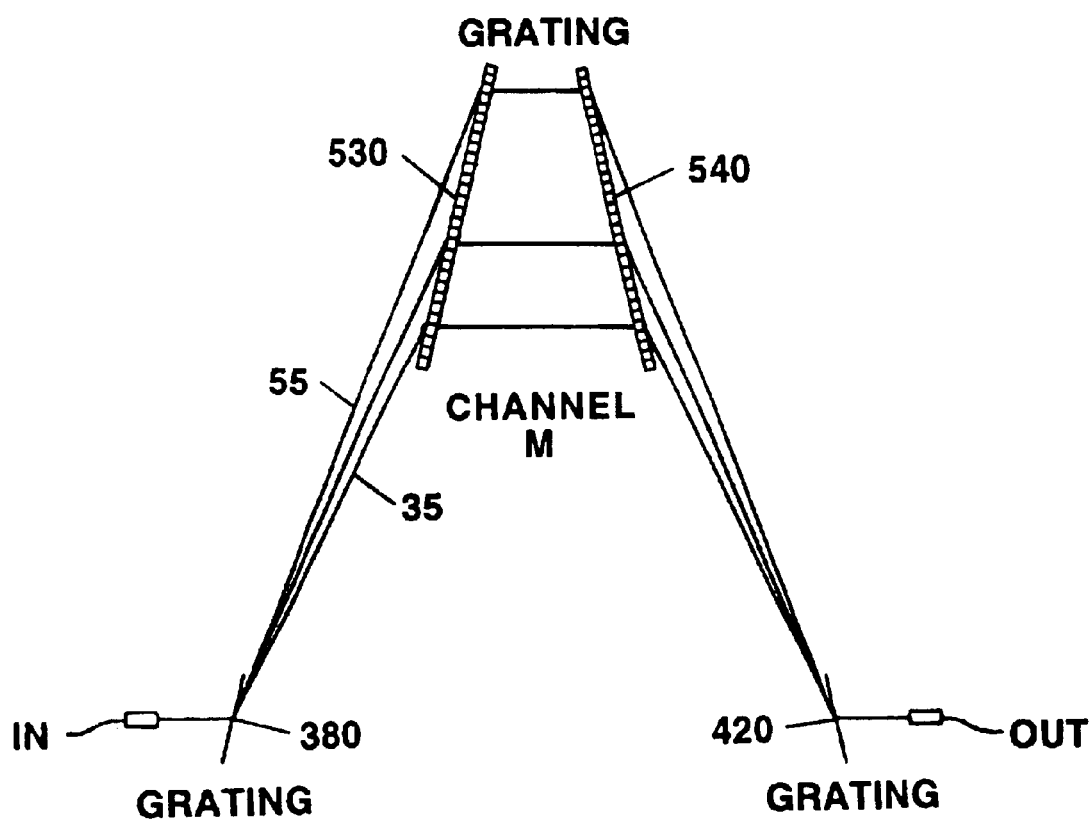
FIG. 6 is a schematic representation of yet another embodiment of a filtering system of this invention.

Shown in FIG. 6, is an embodiment of the filtering system 300 in which the separating sub-system 330 includes a first separating diffraction grating 380, and a second separating switchable diffraction grating 530, the recombining sub-system includes a first recombining switchable diffraction grating 540, and a second recombining diffraction grating 420. The selectable filtering sub-system includes the second separating switchable grating 530, the first recombining switchable grating 540, and, free space propagation between the second separating and the first recombining gratings. In operation, the switchable grating pixels in switchable gratings 530 and 540 for a given spectral component channel are both set to "on" or diffracting states for channels that are to be passed through to the output, and to "off" or transparent states for channels that are to be filtered out from the output beam. Only one of the pair of switchable pixellated gratings 530 and 540 need to be switchable for this filter application-however, by making both of the gratings 530 and 540 switchable, the crosstalk suppression is greatly increased. For example, consider the case where each grating operates at a crosstalk level (contrast) of 25 dB. In other words, when the switchable grating pixel is switched off, the small residual diffracted signal (that is zero in the ideal case) is in fact present but attenuated by 25 dB under that of the beam incident on the grating. For this case, the diffracted "crosstalk" signal (i.e., unwanted presence of the channel that is set to be filtered out) from pixellated switchable grating 530 is at a 25 dB attenuation level, and propagates to the corresponding pixel in grating 540. If Grating 540 is not switchable, that 25 dB attenuation level of crosstalk is roughly maintained through to the output since the unswitchable grating is always "on" or diffracting. If, however, the corresponding pixel of grating 50 is switchable, then it can be set "off" so most of the light in the crosstalk signal is transmitted and not diffracted toward grating 420 and the output. If the grating 540 is similar in performance to grating 530, this will result in a level of crosstalk of the undesired signal in the filtered channel that is now attenuated by 50 dB below the level of the signal in a non-filtered state.

The techniques of the present invention described earlier for shrinking the size of the system through the use of segmented gratings as in the configurations of FIGS. 1b and 1c, steering mirrors as in the configuration of FIG. 2, diffraction from multiple-frequency gratings as in the configuration of FIGS. 4a and 4b, and multiple imaging to reduce beam size as in the configuration of FIG. 3, can be used to further shrink the size (and increase the uniformity of the spacing of the channels) of the wavelength selectable filter configuration shown in FIG. 6.

Figure 7:
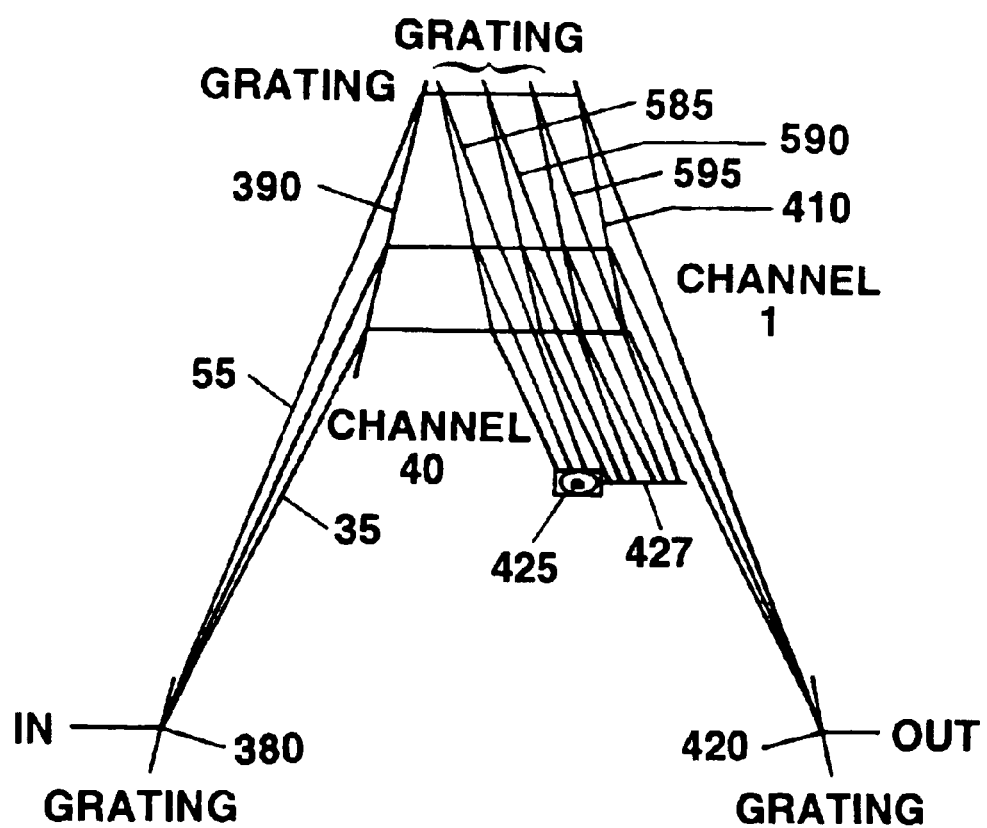
FIG. 7 is a schematic representation of an embodiment of a filtering system of this invention utilizing multiple gratings.

FIG. 7 illustrates an embodiment of system 300 in which multiple pixellated gratings are cascaded to form the wavelength selectable filtering sub-system 340. Utilizing multiple cascaded pixellated switchable gratings 585, 590, 595 will improve the filter contrast ("crosstalk" suppression) in the filtered signals and can reduce cooling loads for large-power signal applications.

The embodiment of FIG. 7 is illustrated with a system in which the separating sub-system includes first separating diffraction grating 380, and second separating diffraction grating 390 and the recombining sub-system includes first recombining diffraction grating 410, and second recombining diffraction grating 420. While three pixellated switchable gratings 585, 590, 595 are shown cascaded in FIG. 7, two, four, five, or another number of switchable pixellated gratings may be cascaded-each providing an additional measure of non-selected signal (crosstalk) suppression. In operation, the pixels of switchable pixellated gratings 585, 590, and 595 are set to "off" (non-diffracting) for each of the desired (unfiltered) channels. These transparent pixels allow the desired channels to pass thru to the recombining sub-system (gratings 410 and 420) and subsequently to the output. The pixels of the switchable pixellated gratings 585, 590, and 595 corresponding to the channels that it is desired to filter out of the output are switched to "on" or diffracting. The first of these gratings encountered by the light in the unwanted channel is switchable pixellated grating 585. This grating diffracts the bulk of the light (signals) in the unwanted channel to dump mirror 425, which is a small mirror that directs the unwanted light out of the system, typically through a window in the package. The advantage of dumping the unwanted optical power out of the package using the first grating is that, for the case of signals that are high power, this represents power that does not need to be pumped out of the package via thermo-electric coolers or other cooling means. [Alternatively this unwanted optical power can be absorbed in the package, but that can add an unwanted thermal cooling burden (e.g., sometimes watts of optical power, depending on the application]. The additional cascaded switchable pixellated diffraction gratings 590 and 595 (and others if included) are then used to further diffract most of the residual unwanted channel signal power that is transmitted (i.e., "leaks") through the first switchable pixellated diffraction grating. Since the bulk of the optical power in unwanted (filtered) channels has already been dumped out of the package by mirror 425, the remaining rejected signals represent negligible thermal load and can be simply directed to an absorber/light block 427. Following the earlier discussion, if each of switchable pixellated diffraction gratings 585, 590, and 595 operate at a contrast of 25 dB, then the unwanted (filtered) channels should be attenuated by approximately 75 dB under the level present in the unfiltered channels.

Embodiments of the multiple switchable grating filter of FIG. 7 are also possible in which the separating sub-system includes an AWG (not shown) and the recombining sub-system includes an AWG (also not shown), similar to FIG. 5b, and in which the separating sub-system includes (segmented grating) separating grating and separating means for enhancing space uniformity (not shown) and the recombining sub-system includes a (segmented grating) recombining grating and recombining means for enhancing space uniformity (also not shown), as in FIG. 5c. Similarly, the techniques of the present invention described earlier for shrinking the size of the system through the use of steering mirrors as in the configuration of FIG. 2, diffraction from multiple-frequency gratings as in the configuration of FIGS. 4a and 4b, and multiple imaging to reduce beam size as in the configuration of FIG. 3, can be used to further shrink the size (and increase the uniformity of the spacing of the channels) of the wavelength selectable filter configuration shown in FIG. 7.

Figure 8:
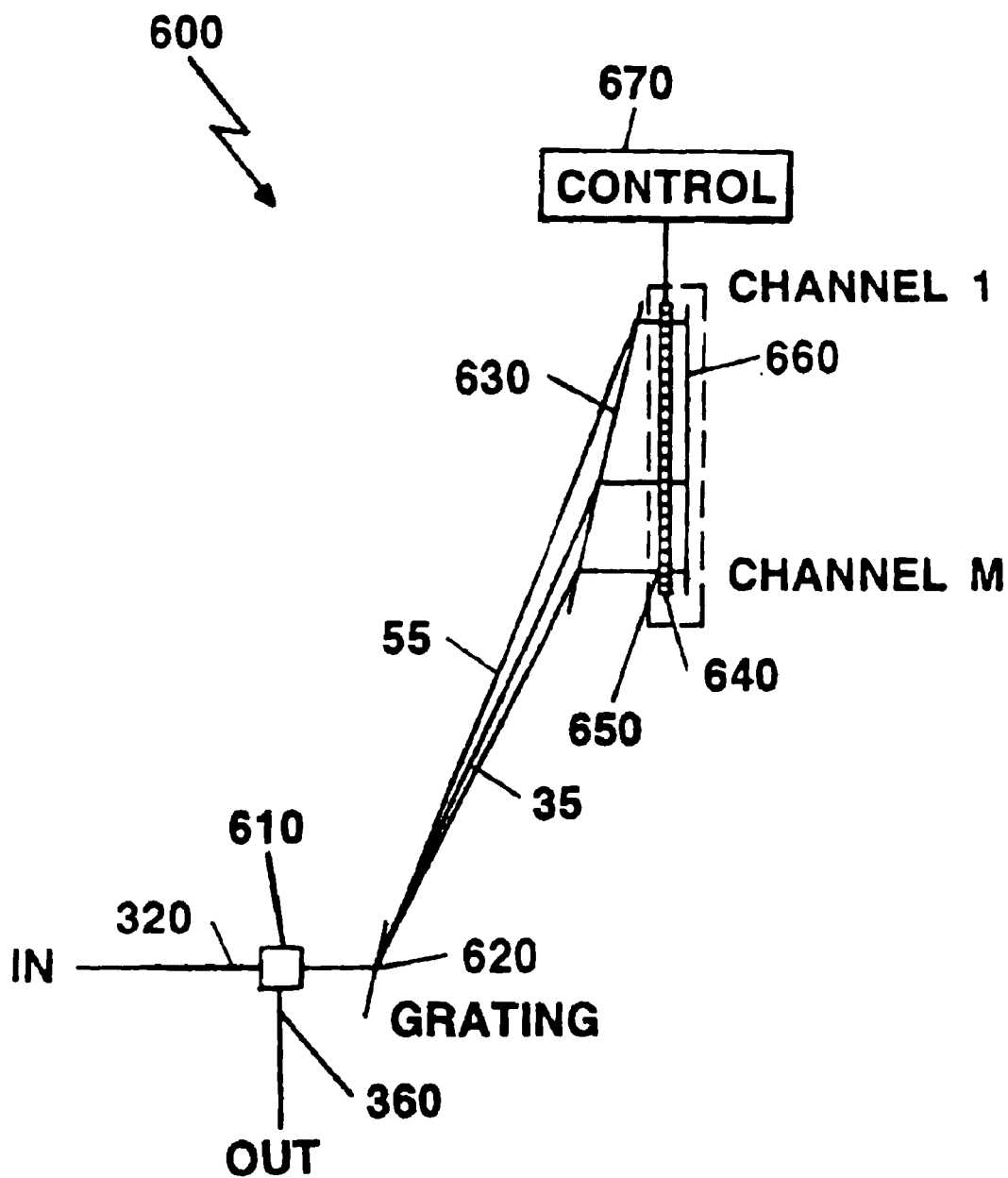
FIG. 8 is a schematic representation of an embodiment of a filtering system of this invention utilizing a grating and a mirror.

An embodiment of a filtering system 600 in which the same components constitute both the separating sub-system and the recombining sub-system is shown in FIG. 8. Filtering system 600 includes a directing/redirecting optical element, such as circulator/Polarization Diversity Filter 610, capable of directing input optical radiation from the input beam/port 320 to first diffraction grating 620 of a pair of diffraction gratings, 620, 630, and capable of redirecting output optical radiation from the recombined output channels to output beam/port 360. The pair of diffraction gratings 620, 630 constitutes a separating sub-system for optical radiation received from the input beam/port 320 and constitutes a recombining sub-system for output channels received from the selectable filtering sub-system 640. The selectable filtering sub-system 640 includes a switchable pixellated transmissive element 650 and a mirror 660. The state of the pixels in the switchable pixellated transmissive element 650, which can be, but is not limited to, a switchable grating or a liquid crystal array, is controlled by control means 670. Considering the case of a switchable pixellated diffraction grating used in the switchable filtering subsystem 640, the pixels in the desired channels are set "off" or transparent, and the pixels in the unwanted (filtered) channels are set to "on" (diffracting). Here since the grating 650 is double passed, the crosstalk levels will be reduced by twice the contrast of a single pass through the grating. As described earlier, this would result in a 50 dB crosstalk suppression for a grating with a 25 dB contrast level.

The techniques of the present invention described earlier for shrinking the size of the system through the use of segmented gratings as in the configurations of FIGS. 1b and 1c, steering mirrors as in the configuration of FIG. 2, diffraction from multiple-frequency gratings as in the configuration of FIGS. 4a and 4b, and multiple imaging to reduce beam size as in the configuration of FIG. 3, can be used to further shrink the size (and increase the uniformity of the spacing of the channels) of the wavelength selectable filter configuration shown in FIG. 8. In addition, the gratings 620 and 630 of the configuration of FIG. 8 may be replaced by a single double-passed AWG, using the disperser/combiner in the form of a double pass version of the configuration of FIG. 5b.

Figure 9:
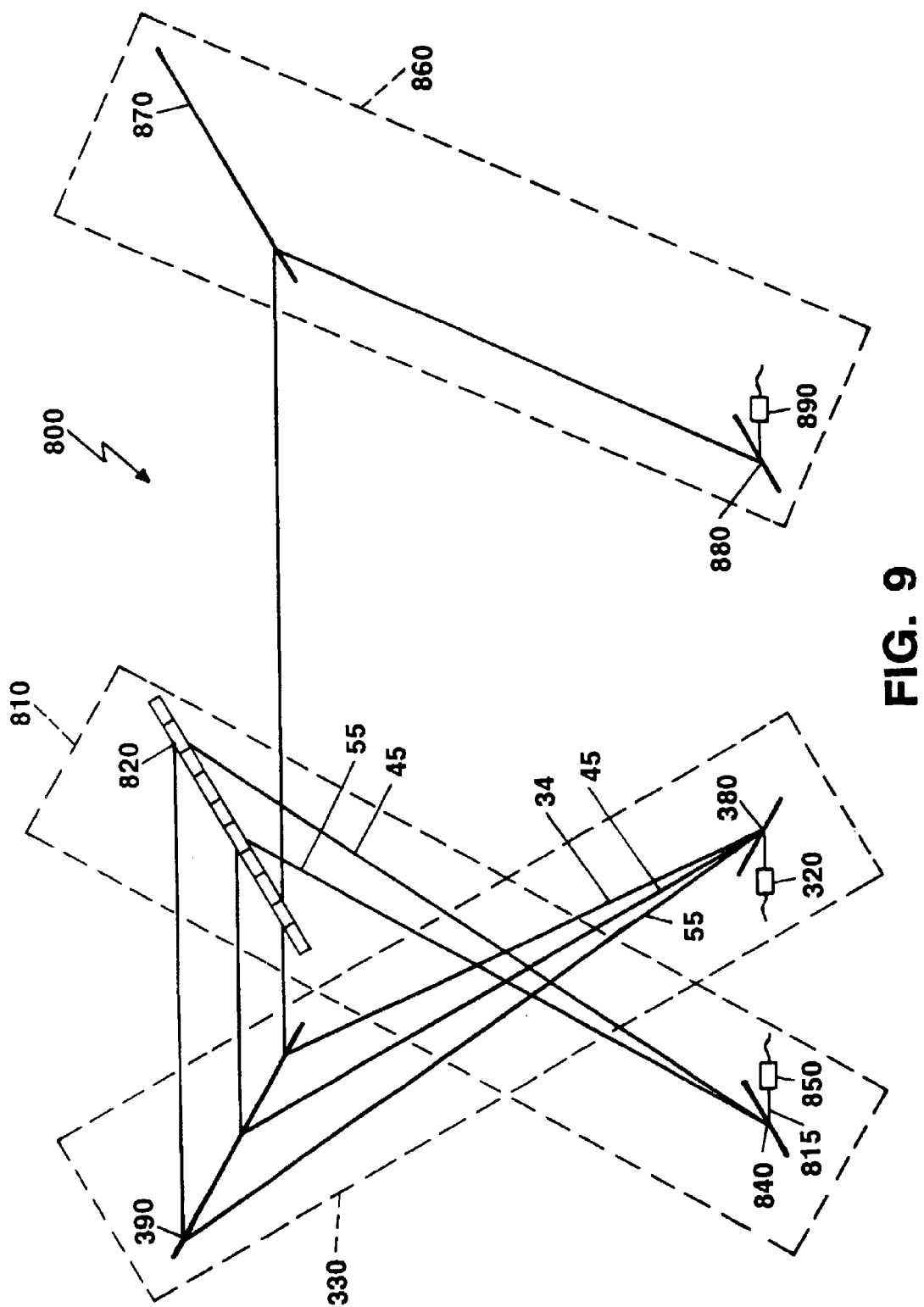
FIG. 9 is a schematic representation of an embodiment of an interleaver of this invention utilizing gratings; and, FIG. 10 is a schematic representation of an embodiment of a band channelizer of this invention utilizing gratings.

An embodiment of an interleaver 800 of this invention utilizing gratings is shown in FIG. 9. Interleaver 800 includes an input beam port 320, a separating sub-system 330, a redirecting sub-system 810, including a pixellated (but not switchable) redirecting optical component 820 and a recombining diffraction grating 840, and an output beam/ port 850. Also included in the interleaver 800 is a final optical sub-system 860, including a final redirecting component 870 and a final recombining diffraction grating 880, and a final output beam/port 890. The separating sub-system in the embodiment shown in FIG. 9 includes a first separating diffraction grating 380, and a second separating diffraction grating 390.

The techniques of the present invention described earlier for shrinking the size of the system through the use of segmented gratings as in the configurations of FIGS. 1*b* and 1*c*, steering mirrors as in the configuration of FIG. 2, diffraction from multiple-frequency gratings as in the configuration of FIGS. 4*a* and 4*b*, and multiple imaging to reduce beam size as in the configuration of FIG. 3, can be used to further shrink the size (and increase the uniformity of the spacing of the channels) of system 800 shown in FIG. 9. These techniques can be applied not only to the disperser subsystem 330 but also to the combiner subsystems 860 and 810.

In another embodiment, the separating and combining sub-systems 330, 860, and 810 may be array waveguide gratings (AWGs, not shown) and the interleaving function implemented by pixellated, non-switchable holographic volume mirrors or other similar free-space optics. In still another embodiment, the separating sub-system may include separating means for enhancing space uniformity (also not shown) as in FIG. 1*b*.

During operation, input beam/port 320 provides input optical radiation 315 to separating sub-system 330. Separating sub-system 330 separates the input optical radiation 315 into distinct input channels 34 through 55. (The number of input optical channels is different for different embodiments. Only three are labeled in FIG. 9.) The distinct input channels 34 through 55 are the inputs to pixellated redirecting optical component 820. The pixellated redirecting optical component 820 redirects a selected group of the distinct input channels, channels 45 through 55, towards the corresponding recombining diffraction grating 840. The corresponding recombining diffraction grating 840 recombines the selected group of the distinct input channels, channels 45 through 55, into one corresponding output beam 815. Output beam 815 is provided through output beam/port 850.

The remaining distinct input channels, depicted as channel 34 in FIG. 9, are transmitted without redirection by the pixellated redirecting optical component 820 and serve as input to the final redirecting component 870. The final redirecting optical component 870 redirects the transmitted group of the distinct input channels, depicted as channel 34 in FIG. 9, towards the final recombining diffraction grating 880. The final recombining diffraction grating 880 recombines the transmitted group of the distinct input channels, depicted as channel 34 in FIG. 9, into one corresponding final output beam. This final output beam is provided through final output beam/port 890.

The usual function of the interleaver is to separate odd and even channels from a dense WDM input to a pair of separate outputs, each containing either the odd or the even channels from the input. Alternatively the interleaver and be used to combine the odd and even channels from two inputs into a single more dense WDM output. This is accomplished by fabricating every other pixel (e.g., every odd pixel) in pixellated redirecting grating 820 to an "off" (transparent) state and the other (even) pixels of pixellated redirecting grating 820 to an "on" state. Accordingly every even channel in input 320 will be output from output port 850, and every odd channel in input 320 will be output from output port 890. The pixellated redirecting grating 820 is typically a fixed, non-switchable pixellated grating, such as a volume holographic grating. If desired, however, this element may be made switchable, thus providing, for example, dynamic switching of which output gets the even and odd channels. By widely separating the neighboring WDM channels on pixellated redirecting grating 820, very desirable filter functions can be obtained, i.e., square-top filter functions that cause very little distortion of the input signals, suitable for short- or long-haul telecommunications applications.

In the embodiment shown in FIG. 9, the pixellated redirecting optical component 820 redirects the even channels, depicted as channels 45 through 55, towards the corresponding recombining diffraction grating 840 where the even channels, channels 45 through 55, are recombined into the even channel output 815. The odd channels, depicted as channel 34 in FIG. 9, are transmitted by the pixellated redirecting optical component 820 and serve as input to the final redirecting component 870. The final redirecting component 870 redirects the odd channels, depicted as channels 34, towards the final recombining diffraction grating 880 where the odd channels, depicted as channels 34, are recombined into the odd channel output 890. In the configuration described above, the system 800 constitutes an interleaver.

The interleaver may be used in the reverse direction to interleave the even and odd inputs from ports 320 and 890, respectively, to single output port 320. Similarly, a second pixellated separating/combining subsystem 810 may be used to provide interleaving of every third channel to 3 beams; or a third and fourth pixellated separating/combining subsystem 810 can be added for interleaving of every fourth channel to 4 beams, etc.

Figure 10:
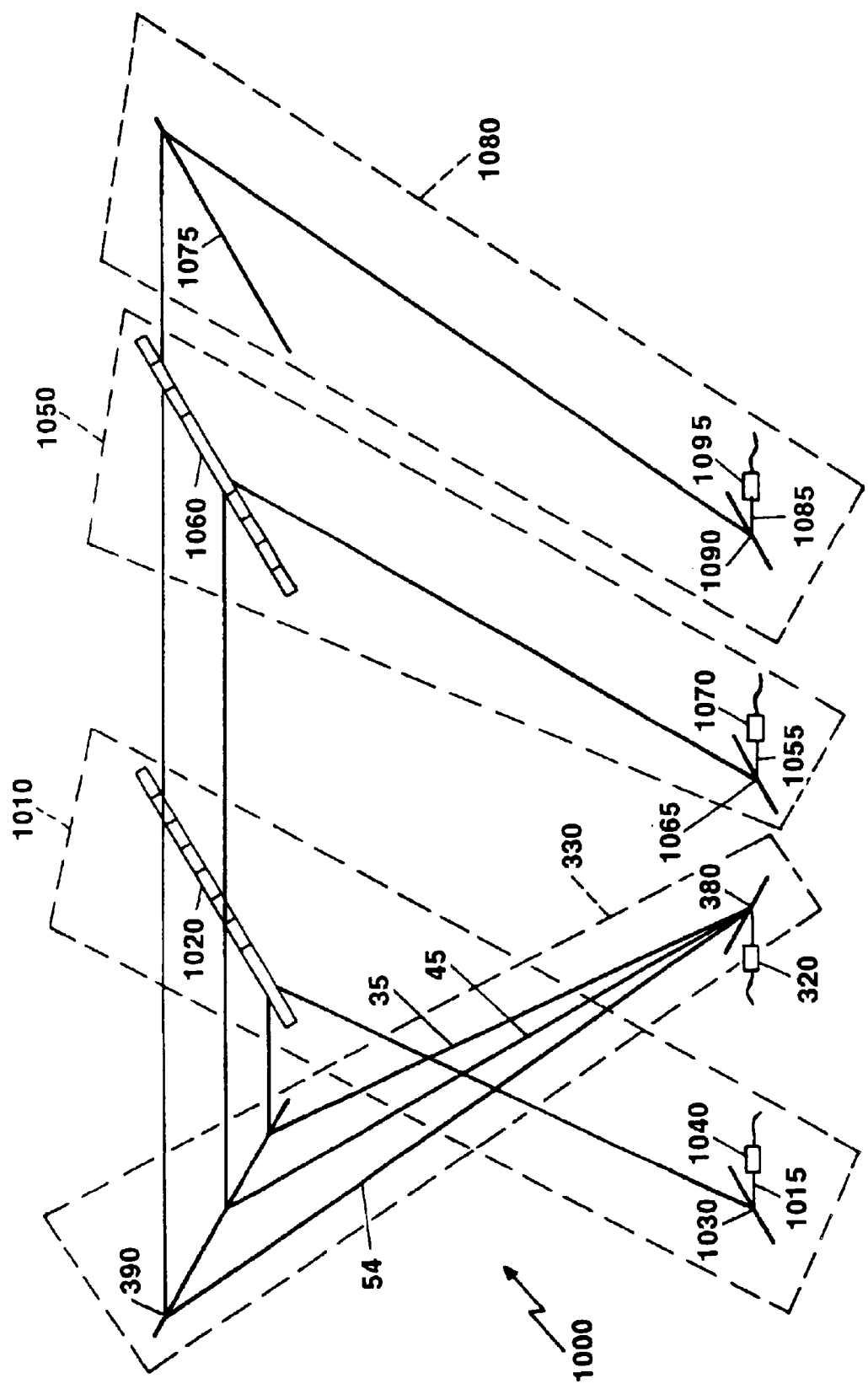

An optical band channelizing system 1000 including two redirecting optical components is shown in FIG. 10. The optical system 1000 includes an input beam port 320, a separating sub-system 330, two redirecting sub-systems, a first redirecting sub-system 1010 and a second redirecting sub-system 1050, and a final optical subsystem 1080. The first redirecting sub-system 1010 includes a pixellated redirecting optical component 1020 and a recombining diffraction grating 1030. The second redirecting sub-system 1050 includes another pixellated redirecting optical component 1060 and another recombining diffraction grating 1065. The final optical subsystem 1080 includes a final redirecting component 1075 and a final recombining diffraction grating 1090. The separating sub-system 330 in the embodiment shown in FIG. 10 includes a first separating diffraction grating 380, and a second separating diffraction grating 390. As noted herein below, other embodiments of the separating sub-system 330 may be used.

During operation, input beam/port 320 provides input optical radiation to separating sub-system 330. Separating sub-system 330 separates the input optical radiation 315 into distinct input channels 35 through 54. (The number of input optical channels is different for different embodiments. Only three are labeled in FIG. 10.) The distinct input channels 35 through 54 are the inputs to pixellated redirecting optical component 1020. The pixellated redirecting optical component 1020 redirects a selected group (band) of the distinct input channels, depicted as channel 35, towards the corresponding recombining diffraction grating 1030. The corresponding recombining diffraction grating 1030 recombines the selected group (band) of the distinct input channels, depicted as channel 35, into one corresponding output beam 1015. Output beam 1015 is provided through output beam/port 1040.

The remaining distinct input channels, channels 45 through 54, are transmitted without redirection by the pixellated redirecting optical component 1020 and serve as input to the second redirecting component 1060. The second redirecting optical component 1060 redirects another selected group (band) of the distinct input channels, depicted as channel 45 in FIG. 10, towards the second recombining diffraction grating 1065. The second recombining diffraction grating 1065 recombines the selected group (band) of the distinct input channels, depicted as channel 45 in FIG. 10, into one corresponding second output beam 1055. The second output beam 1055 is provided through final output beam/port 1070.

The yet remaining distinct input channels, depicted as channel 54 in FIG. 10, are transmitted without redirection by the second pixellated redirecting optical component 1060 and serve as input to the final redirecting component 1075. The final redirecting optical component 1075 redirects the transmitted group of the distinct input channels, depicted as channel 54 in FIG. 10, towards the final recombining diffraction grating 1090. The final recombining diffraction grating 1090 recombines the transmitted group of the distinct input channels, depicted as channel 54 in FIG. 10, into one corresponding final output beam 1085. The final output beam 1085 is provided through final output beam/port 1095.

In the embodiment shown in FIG. 10, the pixellated redirecting optical component 1020 redirects the short-wavelength band of channels, depicted as channel 35, towards the corresponding recombining diffraction grating 1030 where the short-wavelength band of channels, depicted as channel 35, is recombined into the output 1015. The channels in the remaining middle-wavelength and long-wavelength bands, depicted as channels 45 through 54 in FIG. 10, are transmitted by the pixellated redirecting optical component 1020 and serve as input to the second redirecting component 1060. The second redirecting component 1060 redirects the channels in the middle-wavelength band of channels, depicted as channel 45, towards the second recombining diffraction grating 1065 where the channels in the middle-wavelength band, depicted as channel 45, are recombined into the output 1055. The channels in the long-wavelength band, depicted as channel 54 in FIG. 10, are transmitted by the pixellated redirecting optical component 1060 and serve as input to the final redirecting component 1075. The final redirecting component 1075 redirects the channels in the long-wavelength band, depicted as channel 54, towards the final recombining diffraction grating 1090 where the channels in the long-wavelength band, depicted as channel 34, are recombined into the final output 1095. In the configuration described above, the system 1000 constitutes a band channelizer. In other embodiments, two or more than three bands are separated and separately output from among the input channels. Similarly, these band channelizers can be used in reverse to multiplex neighboring bands of channels onto a broad-band output.

The techniques of the present invention described earlier for shrinking the size of the system through the use of segmented gratings as in the configurations of FIGS. 1b and 1c, steering mirrors as in the configuration of FIG. 2, diffraction from multiple-frequency gratings as in the configuration of FIGS. 4a and 4b, and multiple imaging to reduce beam size as in the configuration of FIG. 3, can be used to further shrink the size (and increase the uniformity of the spacing of the channels) of system 1000 shown in FIG. 10. These techniques can be applied not only to the disperser subsystem 330 but also to the combiner subsystems 1010, 1050, and 1080.

In another embodiment, the separating and combining sub-systems 330, 1010, 1050, and 1080 may be array waveguide gratings (AWGS, not shown) and the band channelizing function implemented by pixellated, non-switchable holographic volume mirrors or other similar free-space optics.

The pixellated redirecting optical components 820 (FIG. 9), 1020 and 1060 (FIG. 10) shown in FIGS. 9 and 10 are pixellated grating and may be fixed gratings or switchable gratings. In the embodiment in which the pixellated redirecting optical components 820, 1020, 1060 are switchable gratings, the gratings may be switched by electrical switching, optical switching, or polarization switching by appropriate control means (not shown).

Although the invention has been described with respect to various embodiments, it should be realized this invention is also capable of a wide variety of further and other embodiments within the spirit and scope of the appended claims.

What is claimed is:

1. An optical filtering system comprising:
    an optical separating sub-system;
    said optical separating sub-system being capable of separating input optical radiation from at least one input beam/port into distinct input channels;
    an optical recombining sub-system;
    a selectable filtering sub-system including at least one switchable component, said selectable filtering sub-system being interposed optically between said optical separating sub-system and said optical recombining sub-system; and,
    said selectable filtering sub-system being capable of filtering said distinct input channels to effectuate desired distinct output channels;
    said optical recombining subsystem being capable of redirecting and recombining said desired distinct output channels for output; and
    wherein said separating sub-system comprises a first separating diffraction grating, and a second separating diffraction grating; and,
    wherein said recombining sub-system comprises a first recombining diffraction grating, and a second recombining diffraction grating.

2. The optical filtering system of claim 1, wherein said second separating diffraction grating comprises a switchable grating;
    said first recombining diffraction grating comprises a switchable grating; and,
    the selectable filtering sub-system comprises said second separating switchable grating, said first recombining switchable grating, said second separating switchable grating and said first recombining switchable grating being separated by free space.

3. The optical filtering system of claim 1, wherein said first separating diffraction grating and second recombining diffraction grating are a same first diffraction grating and said second separating diffraction grating and said first recombining diffraction grating are a same second diffraction grating; and
    further comprising a directing/redirecting optical element capable of directing input optical radiation from said at least one input beam/port to said same first diffraction grating, and capable of redirecting output optical radiation from said recombined output channels to at least one output beam/port;
    wherein the selectable filtering sub-system comprises a pixellated switchable transmissive element and a mirror.

4. The optical filtering system of claim 1 wherein said at least one switchable component has a plurality of pixels, and the optical filtering system further comprises:
means operably connected to said selectable filtering sub-system for controlling a state of each of said pixels;
said controlling means being capable of enabling the selecting of said desired distinct output channels.

5. An optical filtering system comprising:
an optical separating sub-system;
said optical separating sub-system being capable of separating input optical radiation from at least one input beam/port into distinct input channels;
an optical recombining sub-system;
a selectable filtering sub-system including at least one switchable component, said selectable filtering sub-system being interposed optically between said optical separating sub-system and said optical recombining sub-system; and,
said selectable filtering sub-system being capable of filtering said distinct input channels to effectuate desired distinct output channels;
said optical recombining subsystem being capable of redirecting and recombining said desired distinct output channels for output;
wherein said optical separating sub-system comprises a first array waveguide grating (AWG); and,
wherein said optical recombining sub-system comprises a second array waveguide grating (AWG).

6. An optical interleaving and/or band channelizing system comprising:
an optical separating sub-system;
said optical separating sub-system being capable of separating input optical radiation from at least one input beam/port into distinct input channels;
at least one redirecting optical sub-system comprising a pixellated redirecting optical component and a corresponding recombining optical component, said pixellated redirecting optical component and said corresponding recombining optical component being optically aligned with one another;
another optical sub-system comprising a redirecting element, and a recombining optical element, said redirecting element and said recombining optical element optically aligned with one another;
each said pixellated redirecting optical component being interposed optically between said optical separating sub-system and said another optical sub-system;
the pixellated redirecting optical component in said at least one redirecting optical sub-system being capable of redirecting a selected group of the distinct input channels towards the recombining optical component in said at least one redirecting optical sub-system and of transmitting a remainder of the distinct input channels, the recombining optical component of said at least one redirecting optical sub-system being capable of recombining the selected group of the distinct input channels into at least one corresponding output beam; and,
the redirecting element in the another optical sub-system being capable of receiving at least a portion of the remainder of the distinct input channels, of redirecting said at least a portion of the remainder of the distinct input channels towards the recombining optical element, the recombining optical element being capable of recombining the at least a portion of the remainder of the distinct input channels into at least another output beam.

7. The optical interleaving and/or band channelizing system of claim 6 wherein said at least one pixellated redirecting optical component comprises a pixellated grating.

8. The optical system of claim 6 wherein at least one pixellated redirecting optical component comprises a pixellated mirror array.

9. The optical system of claim 6 wherein the separating sub-system comprises a first separating diffraction grating and a second separating diffraction grating.

10. The optical system of claim 6 wherein the separating sub-system comprises an array waveguide grating (AWG).

11. The optical system of claim 6 wherein the separating sub-system comprises a first separating diffraction grating and separating means for enhancing space uniformity.

12. The optical system of claim 11 wherein said separating means for enhancing space uniformity comprise at least two second separating diffraction gratings, each one of said at least two second separating diffraction gratings capable of separating and redirecting a predetermined band of said distinct input channels.

13. An optical switching/routing system comprising:
a first optical sub-system comprising a separating optical component and separating means for enhancing space uniformity, said separating optical component and said separating means for enhancing space uniformity optically aligned with one another;
said first optical sub-system being capable of separating input optical radiation from at least one input beam/port into distinct input channels;
a second optical sub-system comprising recombining means for enhancing space uniformity and a recombining optical component, said recombining means for enhancing space uniformity and said recombining optical component optically aligned with one another;
a selectable switching/routing sub-system including at least one pixellated switchable component; said selectable switching/routing sub-system being optically interposed between said first optical sub-system and said second optical sub-system;
said selectable switching/routing sub-system being capable of switching and routing said distinct input channels to desired distinct output channels; and,
said second optical subsystem being capable of redirecting and recombining said desired distinct output channels for output into at least one output beam/port.

14. The optical system of claim 13 wherein said separating means for enhancing space uniformity comprise at least two separating diffraction gratings, each one of said at least two separating diffraction gratings capable of separating and redirecting a predetermined band of said distinct input channels; and,
said recombining means for enhancing space uniformity comprising at least two recombining diffraction gratings, each one of said at least two recombining diffraction gratings capable of redirecting and recombining the predetermined band of said distinct input channels.

15. The system of claim 14 wherein the first optical sub-system further comprises a first folding mirror; and
wherein the second optical sub-system further comprises a second folding mirror.

16. The optical system of claim 14 wherein said at least two second separating diffraction gratings comprise at least two second separating switchable diffraction gratings; and wherein said at least two second recombining diffraction gratings comprise at least two second recombining switchable diffraction gratings; and, the selectable switching/routing sub-system comprises said at least two second separating switchable gratings, said at least two second recombining switchable gratings, and, free space propagation between said at least two second separating and said at least two second recombining gratings.

17. The system of claim 13 further comprising;

a first lens array interposed optically between said first optical sub-system and said selectable switching/routing sub-system; and, a second lens array interposed optically between said selectable switching/routing sub-system and said second optical sub-system.

18. The optical system of claim 13 wherein said separating means for enhancing space uniformity comprise:

a first folding mirror, at least two separating diffraction gratings, and a first retro-reflecting mirror, the first folding mirror capable of reflecting separated predetermined bands of said distinct input channels, at least one of said at least two second separating diffraction gratings capable of separating and redirecting at least one of at least two predetermined bands of said distinct input channels, one of said at least two separating diffraction gratings capable of separating a selected one of said predetermined bands of said distinct input channels and redirecting said selected band of distinct input channels towards the first retro-reflecting mirror; and wherein said recombining means for enhancing space uniformity comprises;

a second folding mirror, at least two second recombining diffraction gratings, and, a second retro-reflecting mirror, at least one of said at least two second recombining diffraction gratings capable of redirecting and recombining at least one of at least two predetermined bands of said distinct input channels, one of said at least two second recombining diffraction gratings capable of receiving a selected one of said predetermined bands of said distinct input channels and redirecting said selected band of distinct input channels towards the second retro-reflecting mirror.

19. The optical system of claim 13 wherein said at least one pixellated switchable component has a plurality of pixels, and the optical system further comprises:

means operably connected to said selectable switching/routing sub-system for controlling a state of each of said pixels;

said controlling means being capable of enabling the selecting of said desired distinct output channels.

* * * * *